UNITED STATES PATENT OFFICE.

JOSEPH B. FREEMAN, OF WHITE HART LANE, TOTTENHAM, COUNTY OF MIDDLESEX, ENGLAND.

WHITE PIGMENT.

SPECIFICATION forming part of Letters Patent No. 286,918, dated October 16, 1883.

Application filed February 27, 1883. (No specimens.) Patented in England October 13, 1882, No. 4,879, and in France February 7, 1883, No. 153,552.

*To all whom it may concern:*

Be it known that I, JOSEPH BENJAMIN FREEMAN, a subject of the Queen of Great Britain, and residing at White Hart Lane, Tottenham, in the county of Middlesex, England, have invented an improved process for making white pigments from oxide of zinc and sulphate of lead, (for which I have received Letters Patent in Great Britain, No. 4,879, dated October 13, 1882;) and I do hereby declare that the following is a full, clear, and exact description of the invention, which will enable others skilled in the art to which it appertains to make and use the same.

This invention relates to an improved white pigment composed of sulphate of lead and oxide of zinc, or zinc-white prepared in the following manner: I produce sulphate of lead, (by dissolving litharge in acetic acid and precipitating by sulphuric acid, or in any other manner,) which is then washed and dried. In this state it is quite useless as a pigment, lacking density and opacity; but by adding a suitable proportion of oxide of zinc or zinc-white and submitting the mixture to great pressure and friction by grinding, when dry, under ordinary edge runners or otherwise, the particles of the zinc and lead become incorporated. The zinc-white may be added to the sulphate of lead when the latter is in a wet state and the mixture then dried and ground as above mentioned. The product, when ground with oil in the customary way, furnishes a pigment having great body and opacity quite equal to the finest white lead produced by the Dutch method, while it is superior to it in color, durability, and density, and possesses little or no smell. I find that one pound of oxide of zinc or zinc-white to three pounds of sulphate of lead answers well. These proportions may be varied, and I do not limit myself to these proportions, as a greater portion of either ingredient may be used.

Having described the nature of the said invention and the manner of performing the same, I declare that what I claim is—

An improved process of making white pigments from oxide of zinc and sulphate of lead, which consists in first grinding the oxide of zinc and sulphate of lead together, and then grinding them with oil, as described.

The above specification of my invention signed by me this 8th day of February, A. D. 1883.

JOSEPH BENJAMIN FREEMAN.

Witnesses:
 JOHN DEAN,
 G. W. WESTLEY,
  *Both of 17 Gracechurch Street, London.*